No. 813,852. PATENTED FEB. 27, 1906.
W. H. BOND.
HARROW.
APPLICATION FILED OCT. 12, 1905.
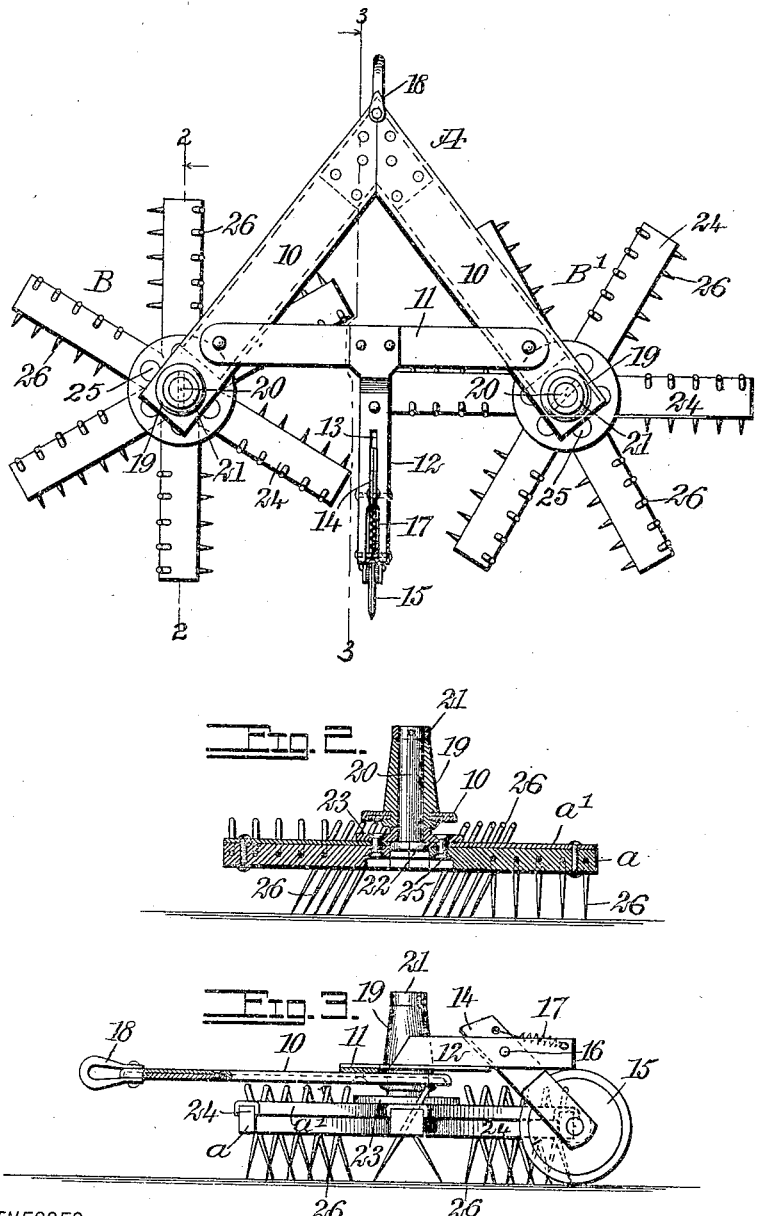
WITNESSES:
INVENTOR
William H. Bond
BY
ATTORNEYS

UNITED STATES PATENT OFFICE.

WILLIAM H. BOND, OF NEWCASTLE, INDIANA.

HARROW.

No. 813,852.        Specification of Letters Patent.        Patented Feb. 27, 1906.

Application filed October 12, 1905. Serial No. 282,488.

*To all whom it may concern:*

Be it known that I, WILLIAM H. BOND, a citizen of the United States, and a resident of Newcastle, in the county of Henry and State of Indiana, have invented a new and Improved Harrow, of which the following is a full, clear, and exact description.

The purpose of the invention is to provide a double revolving harrow which also acts as a leveler so constructed that the ground over which it passes is harrowed both ways at one operation, and, further, to provide the harrow with a spring-controlled colter at the rear.

Another purpose of the invention is to so pitch the harrow-teeth that they will wear evenly and so that as the implement is drawn forward the harrows revolve in opposite directions, and as the harrows are placed side by side and the teeth of the two harrows are inclined in opposite directions all of the ground passed over is effectually broken, stirred up, and leveled.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1 is a plan view of the improved harrow. Fig. 2 is a longitudinal section taken practically on the line 2 2 of Fig. 1, and Fig. 3 is a longitudinal section taken practically on the line 3 3 of Fig. 1.

The frame A of the harrow is substantially A-shaped, comprising two side members 10 at angles to each other and a connecting member 11. A beam 12 is carried rearward from the central portion of the connecting member 11 of the frame, and in the rear end of this beam a longitudinal slot 13 is made. The standard 14 of a disk colter 15 passes up through the said slot 13, being pivoted therein by a suitable pin 16, and a spring 17 is secured to the upper end of the colter-standard and to the upper portion of the beam 12, so that the colter while always held in position for action will accommodate itself to different characters of ground.

A clevis 18 is located at the forward central portion of the frame A, and at the rear end portion of each side beam 10 of the said frame an upwardly-extending sleeve-bearing 19 is secured, as best shown in Fig. 2. A spindle 20 is mounted to turn in each bearing 19, and said spindles extend above and below their bearings, being attached at their upper ends to collars 21 and being provided at their lower ends with heads 22. A disk 23 is secured to or is carried by each spindle 20 at its head portion, as is particularly shown in Fig. 2, and a series of arms 24, usually six in number, are secured to and made to radiate from each of the said disks 23. These arms 24 may be made altogether of metal or altogether of wood; but usually the arms are provided with a body $a$, of wood, and a channeled cap-section $a'$, of metal, and bolts 25 are usually employed to secure the inner ends of the said arms to the said disks.

The arms 24, connected with each disk, constitute the body portion or frame of a revolving harrow, and these harrows are designated as B and B', and as they are located at the rear ends of the limbs 10 of the frame A they are opposite each other, but are a sufficient distance apart to enable them both to operate without interference one with the other.

Each arm is provided with a series of teeth 26. These teeth are arranged in series adjacent to what may be termed the "outer" side edges of the arms and are in longitudinal series. The teeth 26 of the arms are given a decided downward inclination, being diagonally placed, the teeth on each harrow having the same degree of inclination; but the teeth on the harrow B are inclined in an opposite direction to the inclination of the teeth of the opposing harrow B', so that as the implement is drawn forward the harrows revolve in opposite directions, and the teeth on the arms of a harrow track across the teeth of opposing arms on the same harrow, as is indicated in Fig. 3, thus effectually stirring up almost every portion of the ground, and as the two harrows revolve in opposite directions the ground is practically gone over both ways when the harrow has been drawn once over the field.

The harrows B and B' turning in opposite directions cause the implement to pull straight, and preferably the said teeth are tapering, being pointed at their lower ends and of any desired thickness at their upper ends, which latter extend, preferably, above the upper face of the said harrow-arms.

Having thus described my invention, I claim as new and desire to secure by Letters Patent—

In an agricultural implement, the combination with an A-frame and spindles mounted to revolve in the rear end portions of the limbs of the said frame, of harrows each comprising a body attached to one of the spindles, arms radially attached to the said body and teeth diagonally passed through the said arms, the inclination of the teeth of one harrow being opposite to the inclination of the teeth of the opposing harrow, an arm extending rearwardly from the frame between the two harrows, and a colter the shank of which is pivotally mounted in the said arm.

In testimony whereof I have signed my name to this specification in the presence of two subscribing witnesses.

WILLIAM H. BOND.

Witnesses:
L. M. ANDERSON,
EPHRAIM W. CHEW.